(12) United States Patent
Maekawa (10) Patent No.: US 8,536,812 B2
(45) Date of Patent: Sep. 17, 2013

(54) MOTOR CONTROL DEVICE AND ELECTRICAL EQUIPMENT WITH MOTOR CONTROLLED THEREBY

(75) Inventor: Sari Maekawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 444 days.

(21) Appl. No.: 13/014,178

(22) Filed: Jan. 26, 2011

(65) Prior Publication Data

US 2011/0234144 A1    Sep. 29, 2011

(30) Foreign Application Priority Data

Mar. 23, 2010   (JP) ................................. 2010-065997

(51) Int. Cl.
*H02P 6/10* (2006.01)
(52) U.S. Cl.
USPC ............. 318/400.23; 318/400.14; 318/400.15
(58) Field of Classification Search
USPC ............. 318/400.01, 400.02, 400.07, 400.14, 318/400.15, 400.23, 400.24, 611, 623, 629, 318/632, 700, 702
See application file for complete search history.

(56) References Cited

U.S. PATENT DOCUMENTS

| | | | | |
|---|---|---|---|---|
| 5,740,040 | A * | 4/1998 | Kifuku et al. | 701/41 |
| 6,735,284 | B2 * | 5/2004 | Cheong et al. | 318/801 |
| 8,084,977 | B2 * | 12/2011 | Hashimoto | 318/432 |

FOREIGN PATENT DOCUMENTS

| | | |
|---|---|---|
| JP | 7-255193 | 10/1995 |
| JP | 2001-37281 | 2/2001 |
| JP | 2009-44935 | 2/2009 |
| JP | 2009-303435 | 12/2009 |
| JP | 2010-93995 | 4/2010 |
| KR | 10-1999-0005791 | 1/1999 |

OTHER PUBLICATIONS

Office Action issued Jan. 10, 2012 in Japan Application No. 2010-065997 (With English Translation).
Notification of Submission of Argument issued Jun. 21, 2012, in Korean Patent Application No. 10-2011-19853 with English translation.

* cited by examiner

*Primary Examiner* — Bentsu Ro
(74) *Attorney, Agent, or Firm* — Oblon, Spivak, McClelland, Maier & Neustadt, L.L.P.

(57) ABSTRACT

A motor control device includes a current detecting unit detecting current flowing into a motor winding, a speed/electrical angle estimating unit estimating a rotational speed and an electrical angle of the motor, based on the current, a load torque estimating unit estimating load torque to be developed by a load, from a torque current obtained based on the current and the electrical angle, a motor constant and inertia moment of the motor inclusive of the load, a load torque phase calculating unit calculating a phase of periodic fluctuation indicated by the load torque, a torque-compensating current determining unit determining a sinusoidal torque-compensating current, based on the load torque phase, and an amplitude/phase adjusting unit detecting speed fluctuation of the motor to adjust amplitude and phase of the torque compensating current by increasing or decreasing the amplitude and the phase so that the speed fluctuation is reduced.

6 Claims, 13 Drawing Sheets

MOTOR CONTROL DEVICE AND ELECTRICAL EQUIPMENT WITH MOTOR CONTROLLED THEREBY

CROSS-REFERENCE TO RELATED APPLICATIONS

This application is based upon and claims the benefit of priority from Japanese Patent Application No. 2010-65997, filed Mar. 23, 2010, the entire contents of which are incorporated herein by reference.

FIELD

Embodiments described herein relate to a motor control device which controls an electric motor by a position-sensorless control system and electrical equipment which includes a compressor driven by an electric motor controlled by the motor control device.

BACKGROUND ART

Figure 11A:
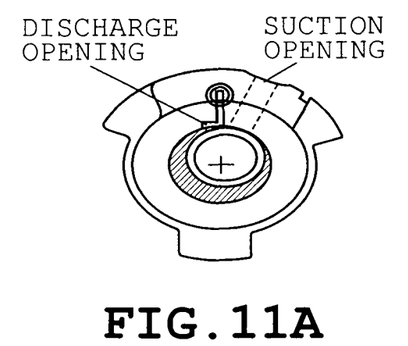
FIGS. 11A and 11B show a sectional structure of single cylinder rotary compressor and load fluctuation occurring depending upon a mechanical rotational angle of a compressor motor, respectively.

For example, when a brushless DC motor is applied to an electric motor driving a compressor or the like, a rotational speed or position of the motor has conventionally been obtained by the use of a position sensor or the like. When the obtained rotational speed differs from a target rotational speed, a current command or a voltage command is changed so that the rotational speed of the motor is adjusted to the target rotational speed. FIG. 11A shows a sectional structure of single-cylinder type rotary compressor. In the shown compressor, load fluctuations occur according to a mechanical rotation angle of compressor motor (see FIG. 11B). The load fluctuations lead to fluctuations in the rotational speed thereby to cause fluctuations in the rotational speed for one turn of the motor by a mechanical angle. This results in production of noise and vibration.

Furthermore, when the operation of the compressor continues while a rotational speed of the motor is fluctuating, stress is applied to a piping system through which a refrigerant or the like is transferred in air conditioners, refrigerators or the like, thereby reducing the service life of the piping system. Accordingly, torque control needs to be executed when the rotational speed of the motor is controlled, whereby rotational speed fluctuations accompanying the load fluctuations need to be suppressed.

In one conventional technique, a section in which a rotor of the motor is rotated one turn is divided into a plurality of subsections, which are set so as to cancel fluctuations in the load torque. Data of patterns of torque fluctuations (torque data) given to each subsection is stored. When the rotational speed of the motor is controlled via an inverter, a control circuit supplies a current or voltage command taking account of torque fluctuations.

However, the data of load torque fluctuations needs to be obtained in the above-described control system. Furthermore, a current command value or the like needs to be adjusted so that motor speed fluctuations are mostly reduced based on the measured data. As a result, data needs to be obtained and command values need to be adjusted according to various operation patterns such as warming operation and cooling operation in the case of air conditioners, with the result that a time period for developing the product is increased.

Another conventional motor control technique detects a magnitude of speed fluctuation during operation of an electric motor and executes a feedback control so that the speed fluctuation is suppressed, whereupon a torque command value is determined. In this technique, however, accuracies in estimating a motor position and a motor speed are reduced when the position-sensorless system is assumed to be employed for the estimation of motor position. As a result, an accurate torque control cannot be carried out. Furthermore, use of past information in the feedback control delays the response to the control. In this case, there is a possibility that torque fluctuations cannot be suppressed sufficiently when occurring in a very short period.

BRIEF DESCRIPTION OF THE DRAWINGS

FIGS. 10A1 to 10E3 are signal waveforms showing the state where speed fluctuations are actually suppressed.

DETAILED DESCRIPTION

According to one embodiment, a motor control device comprises an electric power supply unit which supplies AC current to an electric motor driving a load; a current detecting unit which detects current flowing into a winding of the motor; a speed/electrical angle estimating unit which estimates a rotational speed and an electrical angle of the motor, based on the current detected by the current detecting unit; a load torque estimating unit which estimates a load torque to be produced by the load, from a torque current obtained based on the current detected by the current detecting unit and the electrical angle estimated by the speed/electrical angle estimating unit, a motor constant and inertia moment of the motor inclusive of the load; a load torque phase calculating unit which calculates a phase of periodic fluctuation indicated by the load torque; a torque-compensating current determining unit which determines a sinusoidal torque-compensating current, based on the load torque phase; and an amplitude/phase adjusting unit which detects a speed fluctuation of the motor to adjust an amplitude and a phase of the torque-compensating current by increasing or decreasing the amplitude and the phase so that the speed fluctuation is reduced.

Figure 1:
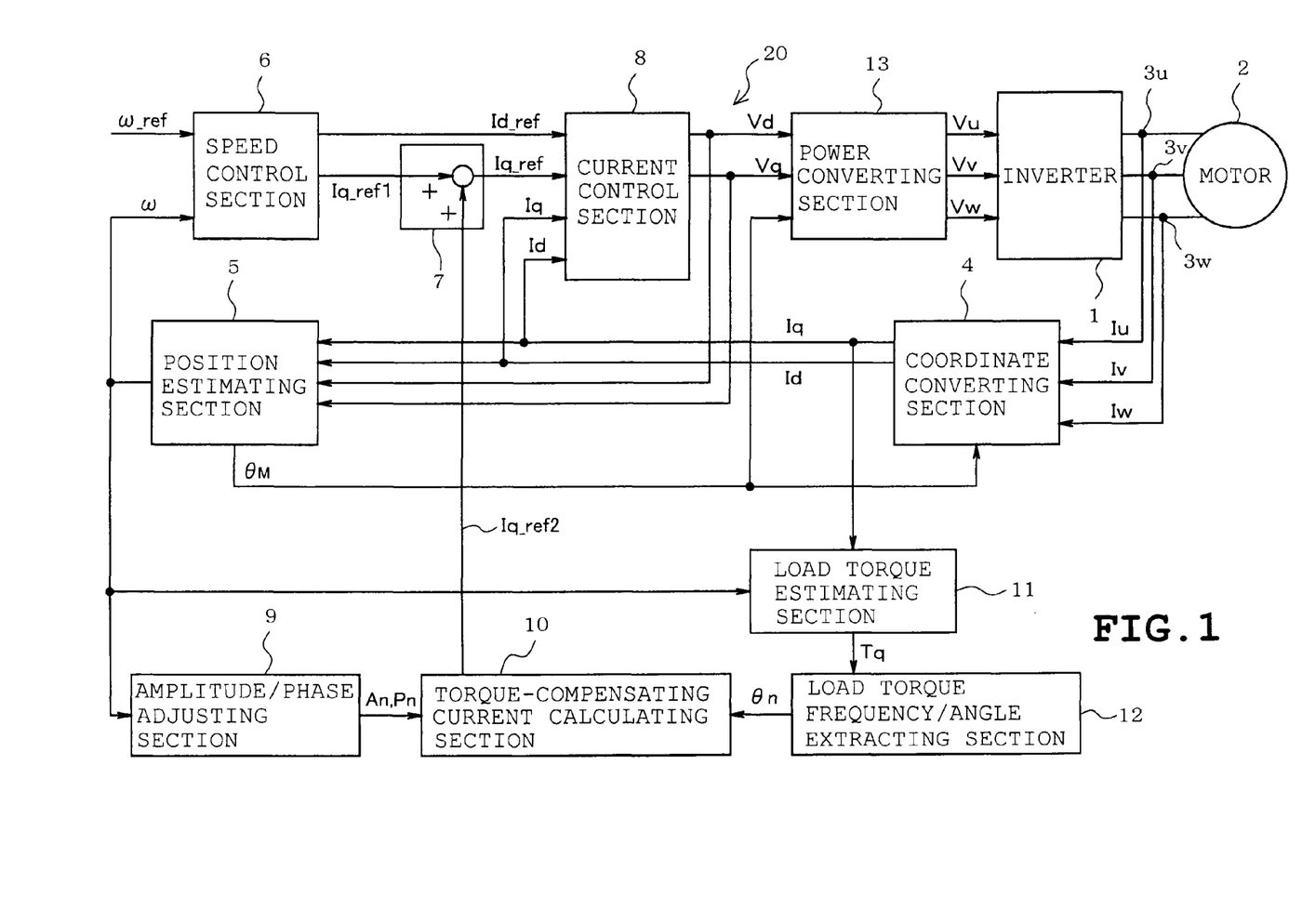
FIG. 1 is a block diagram showing an electrical arrangement of the motor control device according to one embodiment.

An embodiment will be described with reference to FIGS. 1 to 10. Referring to FIG. 1, a motor control device 20 of the embodiment is shown in the form of a block diagram. An inverter circuit 1 (an electric power supply unit) comprises, for example, six insulated gate bipolar transistors (IGBTs) which serve as semiconductor switching elements and are not shown are connected into a three-phase bridge configuration. The inverter circuit 1 has three-phase output terminals connected to terminals of, for example, a star-connected three-phase winding of a brushless DC motor 2 (a permanent magnet synchronous motor).

Current detecting sections $3_u$, $3_v$ and $3_w$ (a current detecting unit) are current detectors (current transformers, for example) which are provided on three-phase output lines of the inverter circuit 1 to detect three-phase currents $I_u$, $I_v$ and $I_w$ respectively. In this case, alternatively, only two of the three-phase currents may be detected and the other phase current may be obtained by computing. Current detection signals generated by the current detecting sections $3_u$, $3_v$ and $3_w$ are supplied to a coordinate converting section 4, which converts the signals to digital data by an A/D converter (not shown). The coordinate converting section 4 converts the three-phase currents $I_u$, $I_v$ and $I_w$ into two-phase currents $I_\alpha$ and $I_\beta$. The coordinate converting section 4 further converts the currents $I_\alpha$ and $I_\beta$ of coordinate system at rest into d-axis and q-axis currents $I_d$ and $I_q$ of the rotating coordinate system (X-Y coordinate system), based on a rotation phase angle $\theta_M$ estimated by a position estimating section 5 (a speed/electrical angle estimating unit).

A speed control section 6 (a target current calculating unit) executes a proportional-integral (PI) control for the difference between a speed command $\omega\_{ref}$ and a motor speed $\omega$ (an angular speed) estimated by the position estimating section 5, thereby generating a q-axis current command $I_{q\_ref1}$ so that the motor speed $\omega$ follows the speed command $\omega\_{ref}$. The q-axis current command $\omega\_{ref}$ is supplied to a current command synthesizing section 7. Furthermore, the speed control section 6 normally supplies zero as an excitation current command $I_{d\_ref}$ and a negative value as the excitation current command $I_{d\_ref}$ when field weakening or the like is carried out.

A current control section 8 (a target voltage calculating unit) executes a PI control calculation for the difference between the excitation current command $I_{d\_ref}$ supplied thereto from the speed control section 6 and the q-axis current command $I_{q\_ref}$ both supplied thereto from the respective speed control section 6 and the current command synthesizing section 7 and the d-axis and q-axis currents $I_d$ and $I_q$ converted by the coordinate converting section 4. As a result, the current control section 8 generates and supplies d-axis and q-axis voltage command values $V_d$ and $V_q$ so that the d-axis and q-axis currents $I_d$ and $I_q$ follow the excitation current commands $I_{d\_ref}$ and $I_{q\_ref}$ respectively.

An amplitude/phase adjusting section 9 (an amplitude/phase adjusting unit) calculates a differential value of the fluctuation of the estimated speed $\omega$ obtained by the position estimating section 5, thereby generating amplitude $A_n$ and phase $P_n$ both of which are supplied to a torque-compensating current calculating section 10 (a torque-compensating current determining unit) so that an estimated speed fluctuation value is decreased. The amplitude/phase adjusting section 9 will be described in detail later. A load torque estimating section 11 (a load torque estimating unit) estimates load torque $T_q$ from the q-axis current $I_q$ supplied thereto from the coordinate converting section 4, the speed $\omega$ estimated by the position estimating section 5 and a motor constant of the motor 2, thereby supplying a result of estimation to a load torque frequency/angular extracting section 12 (a load torque phase calculating unit).

A current command synthesizing section 7 executes additive synthesis for the q-axis current command $I_{q\_ref1}$ generated by the speed control section 6 and a torque-compensating current command $I_{q\_ref2}$ calculated by a torque-compensating current calculating section 10, thereby calculating the q-axis current command $I_{q\_ref}$. A power converting section 13 converts voltage command values $V_d$ and $V_q$ to the three-phase voltage command values $V_u$, $V_v$ and $V_w$, supplying the command values to the inverter circuit 1. The three-phase voltage command values are converted to PWM signals, for example, for conduction of pseudo-sinusoidal waveform current, being supplied to gates of the IGBs constituting the inverter circuit 1.

The above-described arrangement except for the inverter circuit 1 is realized by the software that is executed by a microcomputer and constitutes a motor control device 20 performing a vector control. For example, the microcomputer may comprise an input/output port, a serial communication circuit, an A/D converter for input of analog signals such as a current detection signal, a timer for the PWM processing and the like, although none of which are shown.

Figure 2:
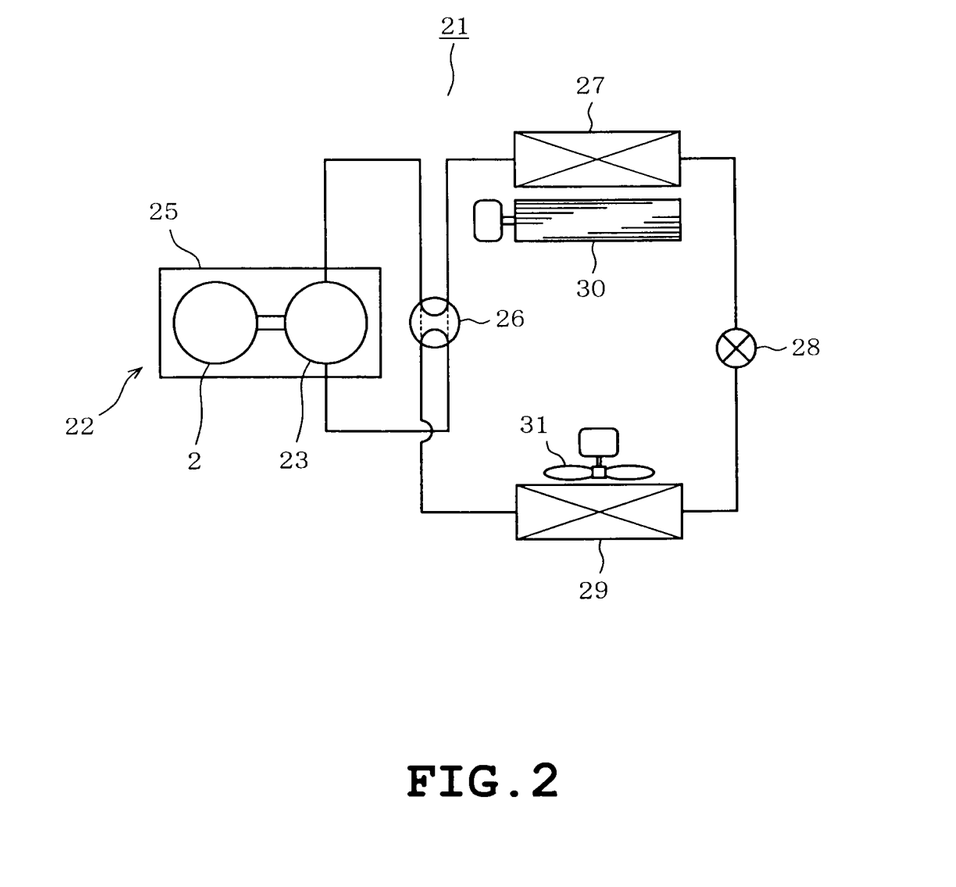
FIG. 2 schematically shows the structure of an air conditioner in which the motor control device is incorporated.

FIG. 2 shows a case where the motor control device 20 is applied to an air conditioner. The air conditioner comprises a heat pump 20 constituted by a compressor 22. The compressor 22 comprises a compressing section (load) 23 which is housed in a hermetic steel container together with the motor 2. The motor 2 includes a rotor shaft connected to the compressing section 23. The compressor 22, a four-way valve 26, an indoor heat exchanger 27, a decompressor 28 and an outdoor heat exchanger 29 are connected to one another by pipes serving as a refrigerant passage thereby to constitute a closed loop. The compressor 22 is a rotary type single-cylinder compressor, for example.

The four-way valve 26 assumes a state as shown by solid line in FIG. 2 during a warming operation. High-temperature refrigerant compressed by the compressing section 23 of the compressor 22 is supplied through the four-way valve 26 into the indoor heat exchanger 27 thereby to be condensed. The refrigerant is thereafter decompressed by the decompressor 28 such that the temperature thereof is reduced. The low-temperature refrigerant flows into the outdoor heat exchanger 29 thereby to be evaporated and returned into the decompressor 28. On the other hand, the four-way valve 26 is switched into a state as shown by broken line in FIG. 2 in a cooling operation. Accordingly, the high-temperature refrigerant compressed by the compressing section 23 of the compressor 22 is supplied through the four-way valve 26 into the outdoor heat exchanger 29 thereby to be condensed. The refrigerant is subsequently decompressed by the decompressor 28 such that the temperature thereof is reduced. The low-temperature refrigerant flows into the indoor heat exchanger 27 thereby to be evaporated and returned into the compressor 22. Fans 30 and 31 are operated to supply air flow into the indoor and outdoor heat exchangers 27 and 29 respectively so that heat exchange is efficiently carried out between the heat exchangers 27 and 29 and the respective indoor air and outdoor air.

Figure 3:
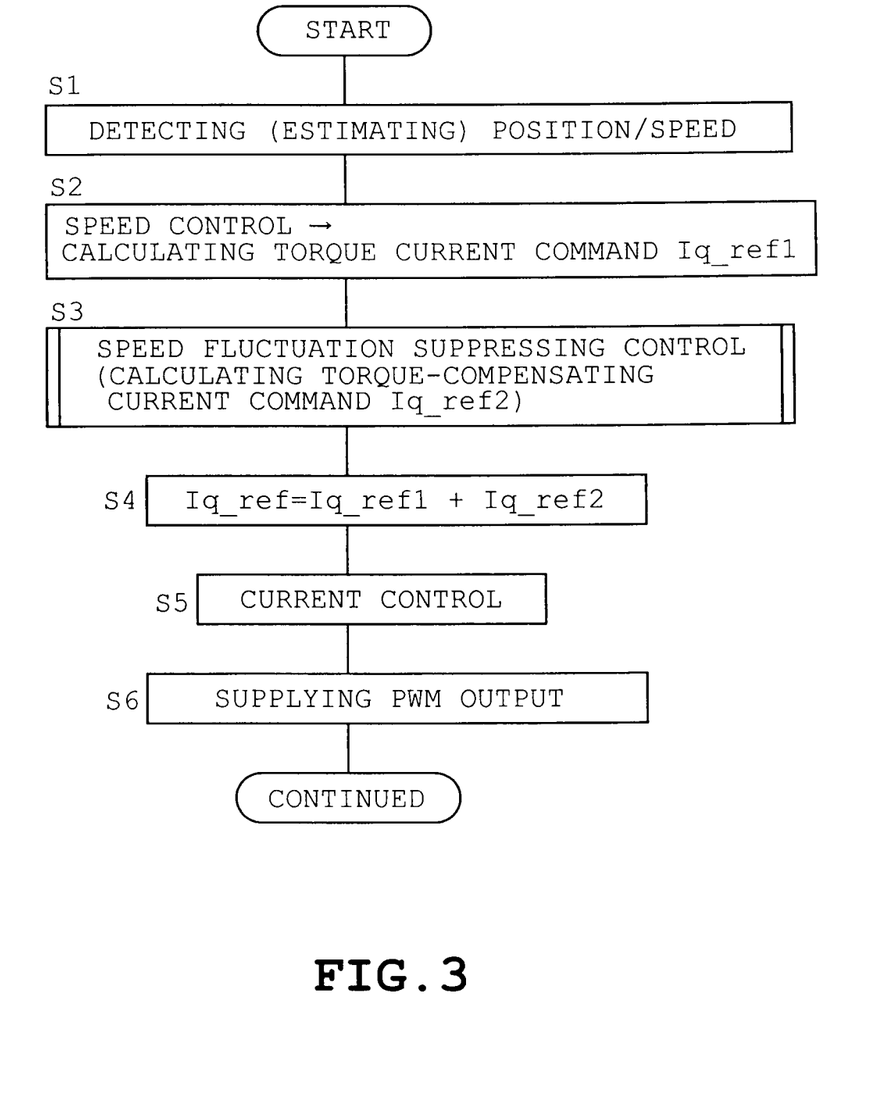
FIG. 3 is a flowchart showing the main routine executed by a control device.

The processing in the embodiment will now be described with reference to the flowcharts of FIGS. 3, 4 and 5A to 5C. Referring to FIG. 3, a main routine indicative of a principal processing for the motor control is shown. Firstly, the position estimating section 5 estimates the speed $\omega$ of the motor 2 using the following d-axis motor voltage equation (1) and integrates the motor speed $\omega$ thereby to obtain the rotation phase angle $\theta_M$ (step S1):

$$V_d = R \cdot I_d - \omega \cdot L_q \cdot I_q \tag{1}$$

Subsequently, the speed control section 6 calculates the torque current command value $I_{q\_ref1}$ (step S2). Furthermore, the amplitude/phase adjusting section 9 calculates the torque current command value $I_{q\_ref2}$ (step S3; and a speed fluctuation suppressing control). The current command synthesizing section 7 then adds both aforementioned commands thereby to obtain the torque current command value $I_{q\_ref}$ (step S4). The current control section 8 then controls the current based on the torque current command value $I_{q\_ref}$ (step S5), and the power converting section 13 generates and delivers a three-phase PWM signal from the voltage command values $V_d$ and $V_q$ (step S6). The above-described processing is periodically executed in the main routine.

Figure 4A:
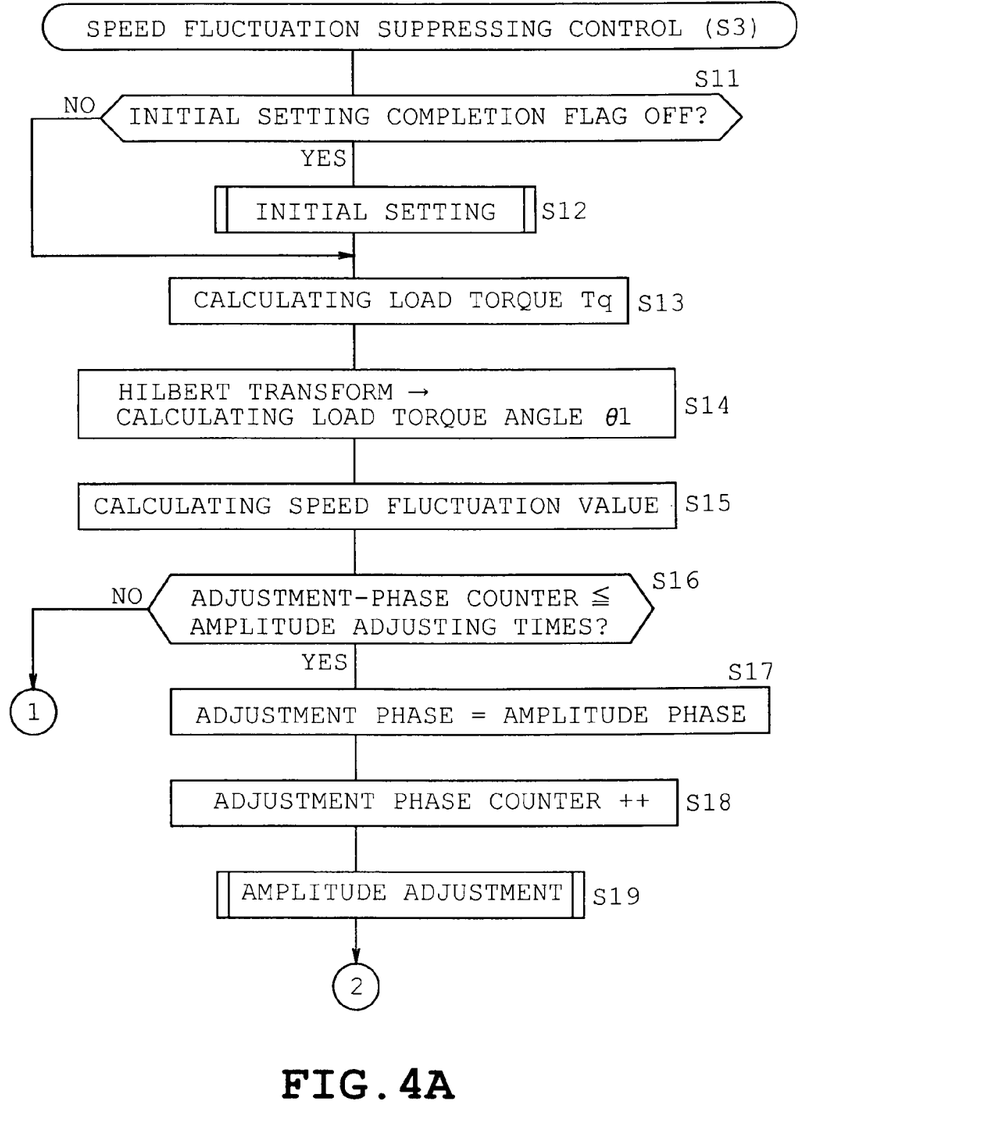
FIGS. 4A and 4B are flowcharts showing the details of speed fluctuation suppressing control at step S3 in FIG. 3.
Figure 4B:
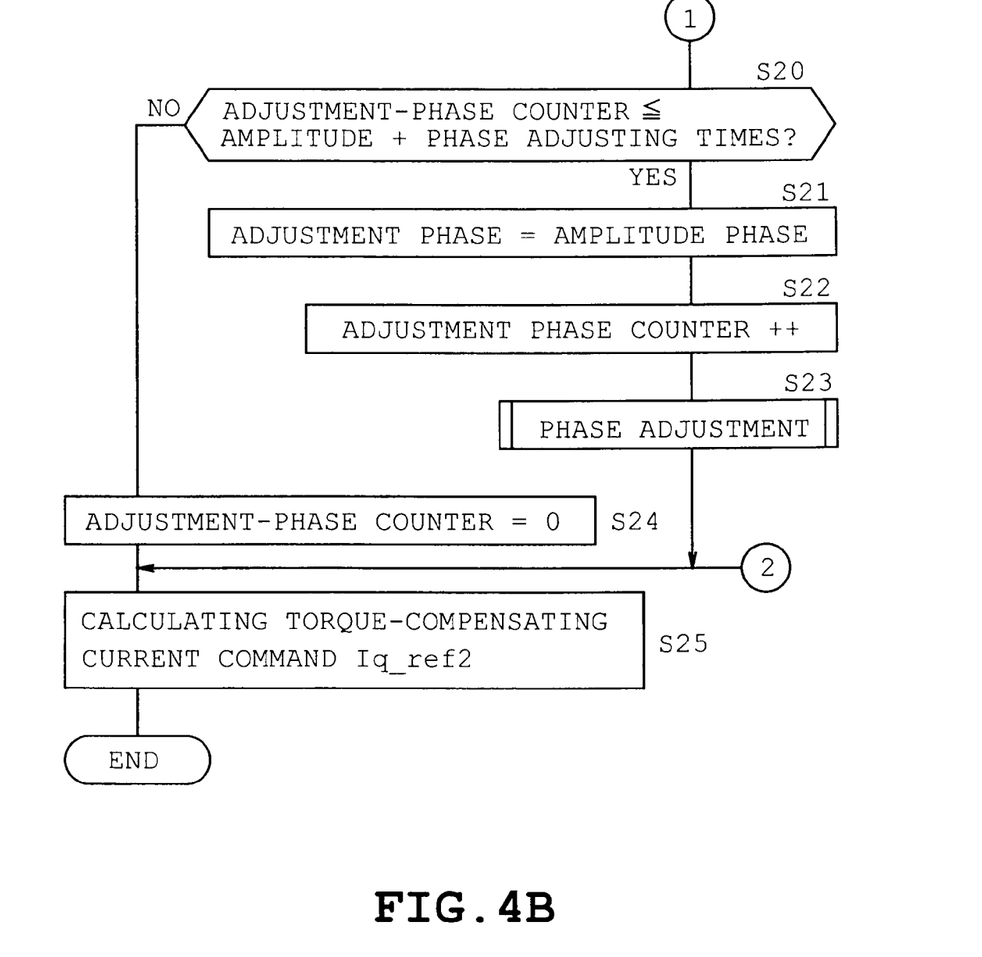

Referring to FIGS. 4A and 4B, the speed fluctuation suppressing control at step S3 is shown in detail. Firstly, an initial setting process is carried out (step S12) when an initial setting completion flag is determined to be OFF (step S11: YES). The load torque estimating section 11 executes calculation using the following equation (2) to estimate load torque $T_q$ from the motor current $I_q$, the torque constant $K_t$ and the inertia moment $J_m$ (step S13):

$$T_q = I_q \cdot K_t - J_m \cdot (d_\omega/d_t) \quad (2)$$

On the other hand, the motor control device 20 advances to step S13 when the initial setting completion flag is ON (NO at step S11). Since load torque $T_q$ is estimated for the purpose of obtaining a phase angle $\theta_1$ that is a fluctuation angle of the load torque $T_q$, an estimate accuracy of the load torque $T_q$ has less importance. The inertia moment $J_m$ inclusive of load is generally difficult to measure and estimate. Accordingly, the control manner executed in the embodiment is less affected by these constants even when the constants have respective certain tolerances.

A load torque frequency/angle extracting section 12 extracts a frequency and a phase angle of fluctuation caused in the load torque $T_q$ estimated by the load torque estimating section 11 (step S14). Several manners are possible of extracting the phase and frequency of a single-phase AC signal, and an extracting manner with the use of the Hilbert transform is employed in the embodiment. The use of the Hilbert transform provides an orthogonal component with 90-degree phase lead relative to an analytical signal serving as an input.

A Hilbert transformer employed in the embodiment comprises first to sixth finite impulse response (FIR) filters as shown by the following equation (3):

$$T_{qh} = \alpha_1 \cdot T_q(0) + \alpha_2 \cdot T_q(2) - \alpha_2 \cdot T_q(4) - \alpha_1 \cdot T_q(6) \quad (3)$$

where $T_q(0)$ is an analytical signal of this time (a load torque value);
  $T_q(2)$ is an analytical signal two control periods ago;
  $T_q(4)$ is an analytical signal four control periods ago;
  $T_q(6)$ is an analytical signal six control periods ago;
  $T_{qh}$ is a Hilbert transform output; and
  $\alpha_1$ and $\alpha_2$ are filter constants.

However, the FIR filter reduces a frequency component of the analytical signal. In view of this drawback, an amplitude compensation is carried out using a previous value $P_d(1)$ of the period $P_d$ of the load torque value $T_q$ that will be obtained later. In this case, a discrete system is employed for the calculation of the aforesaid previous value. The following equation (4) shows an equation of the Hilbert transform inclusive of the amplitude compensation:

$$T_{qh} = \{\alpha_1 \cdot T_q(0) + \alpha_2 \cdot T_q(2) - \alpha_2 \cdot T_q(4) - \alpha_1 \cdot T_q(6)\} \times \{\alpha_3 \cdot P_d(1) + \alpha_4\} \quad (4)$$

where $\alpha_3$ and $\alpha_4$ are amplitude compensation coefficients.

Figure 7:
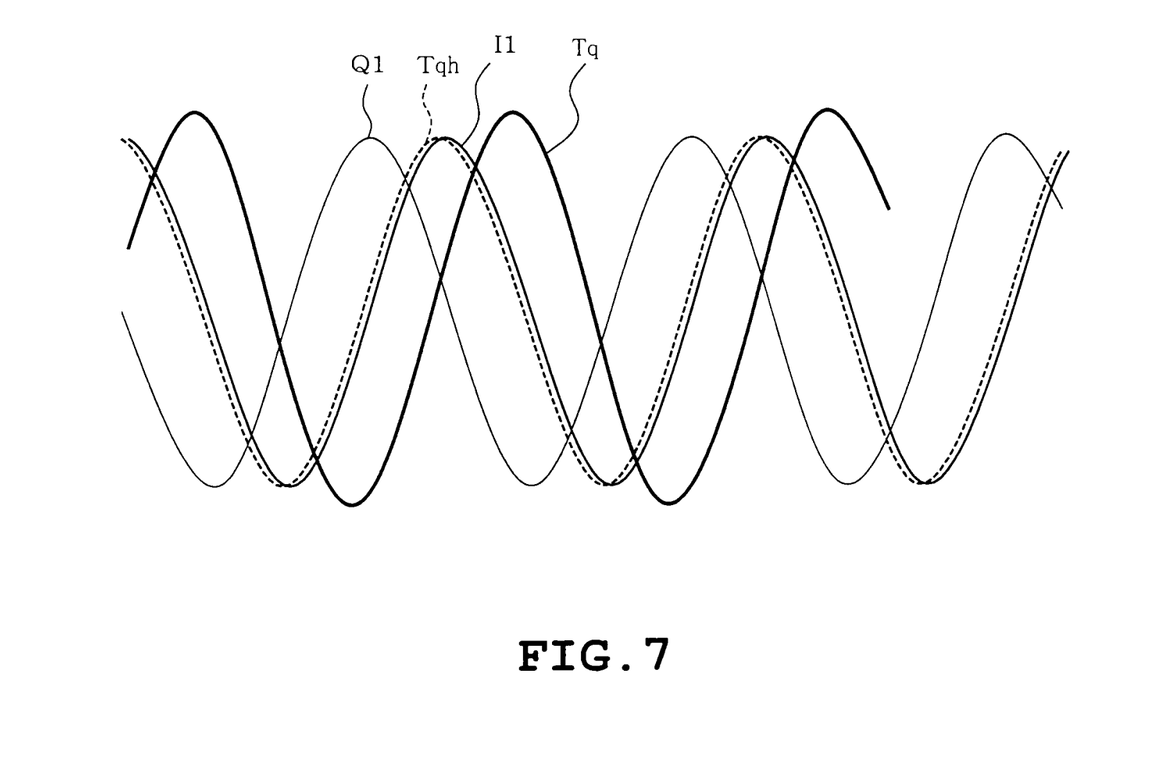
FIG. 7 shows various signal waveforms such as a load torque value Tq which is an analytical signal obtained by the Hilbert transform.

FIG. 7 shows various signals including a load torque value $T_q$ that is an analytical signal. Reference symbol $T_{qh}$ designates a value obtained by passing the load torque component through the Hilbert transformer using equation (4). Value $T_{qh}$ is further passed through the Hilbert transformer so that an orthogonal component $Q_1$ with 90-degree phase lead is calculated. An in-phase component $I_1$ designates a signal generated three control periods before the value $T_{qh}$. In this case, the signal generated three control periods before the value $T_{qh}$ is selected since the central value corresponds to the third filter operation in the first to sixth filter operations.

These orthogonal and in-phase components $Q_1$ and $I_1$ are further processed by the Hilbert transform so that components jI and jQ are calculated. Components $I_2$ and $Q_2$ are obtained from the components $I_1$, $Q_1$, jI and jQ as follows:

$$Q_1 = \quad (5)$$
$$\{\alpha_1 \cdot T_{qh}(0) + \alpha_2 \cdot T_{qh}(2) - \alpha_2 \cdot T_{qh}(4) - \alpha_1 \cdot T_{qh}(6)\} \times \{\alpha_3 \cdot P_d(1) + \alpha_4\}$$

$$I_1 = T_{qh}(3) \quad (6)$$

$$jI = \{\alpha_1 \cdot I_1(0) + \alpha_2 \cdot I_1(2) - \alpha_2 \cdot I_1(4) - \alpha_1 \cdot I_1(6)\} \times \{\alpha_3 \cdot P_d(1) + \alpha_4\} \quad (7)$$

$$jQ = \quad (8)$$
$$\{\alpha_1 \cdot Q_1(0) + \alpha_2 \cdot Q_1(2) - \alpha_2 \cdot Q_1(4) - \alpha_1 \cdot Q_1(6)\} \times \{\alpha_3 \cdot P_d(1) + \alpha_4\}$$

$$I_2 = I_1 - jQ \quad (9)$$

$$Q_2 = Q_1 - jI \quad (10)$$

where $I_1$ is in-phase component, $Q_1$ is orthogonal component, $I_2$ is complex-averaged in-phase component and $Q_2$ is complex-averaged orthogonal component.

Complex square sum of analytical signal $I_2$ and orthogonal signal $Q_2$ is obtained from the following equations (11) and (12):

$$R_e = I_2^2 + Q_2^2 \quad (11)$$

$$I_m = I_2 \cdot jQ - Q_2 \cdot I_2 \quad (12)$$

where $R_e$ is real component and $I_m$ is imaginary component.

A period $P_d$ of load torque value is obtained from equation (13) using the obtained real component $R_e$ and imaginary component $I_m$. The period $P_d$ is used for amplitude compensation of the Hilbert transformer as described above:

$$P_d = 360/\{\arctan(I_m/R_e)\} \quad (13)$$

Furthermore, the following equation (14) is used to obtain arc tangent values of the in-phase component $I_1$ and the orthogonal component $Q_1$ both calculated in the process of calculating the period $P_d$, and the phase angle $\theta_1$ of load torque fluctuation is also obtained:

$$\theta_1 = \arctan(Q_1/I_1) \quad (14)$$

Thus, the phase angle $\theta_1$ of load torque fluctuation is obtained at step S14.

The amplitude/phase adjusting section 9 advances to steps S16 to S25 to adjust an amplitude and phase of the torque-compensating current command $I_{q\_ref2}$ after having obtained the fluctuation value of the motor speed ω (step S15). More specifically, the amplitude/phase adjusting section 9 obtains a differential value of fluctuation of the estimated speed ω calculated by the position estimating section 5, supplying signals of amplitude $A_n$ and phase $P_n$ constituting the torque compensating current command $I_{q\_ref2}$ so that the estimated speed fluctuation value is reduced. Further more specifically, the amplitude/phase adjusting section 9 sets initial adjusting values (increase or decrease) of the amplitude and phase and determines whether or not the estimated speed differential value is positive or negative. When the differential value is negative, the amplitude/phase adjusting section 9 maintains the current increasing/decreasing directions of the respective amplitude and phase. When the differential value is positive, the amplitude/phase adjusting section 9 reverses the current increasing/decreasing directions of the respective amplitude and phase so that the current increasing/decreasing directions are opposed to the respective directions in the last control period. The amplitude/phase adjusting section 9 generates amplitude and phase signals alternately every control period while switching adjusting stages of the amplitude and the phase alternately.

Figure 5A:
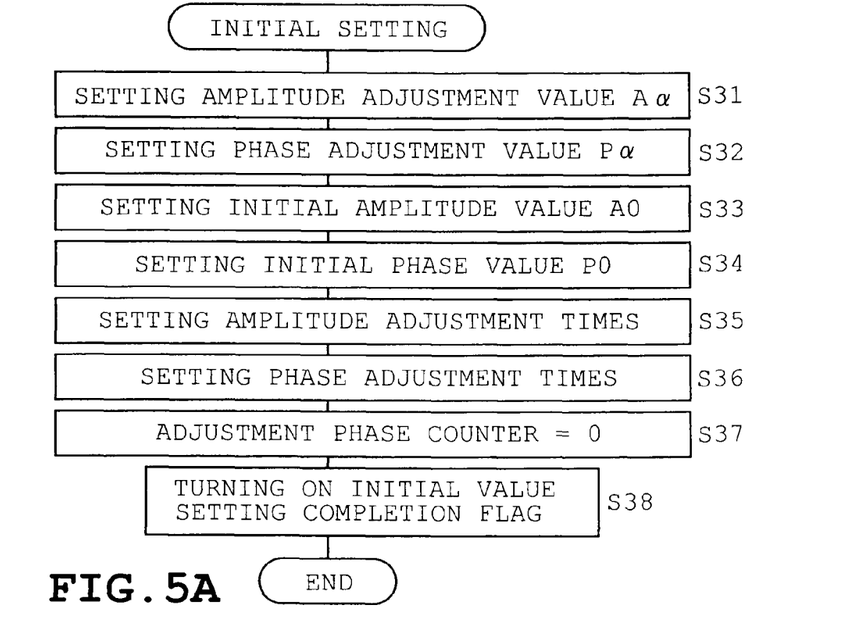
FIGS. 5A, 5B and 5C are flowcharts showing an initial setting process, an amplitude adjusting process and a phase adjusting process respectively.

The initial setting process at step S12 will first be described in detail with reference to FIG. 5A. When having set an adjusting value $A_\alpha$ of amplitude and an adjusting value $P_\alpha$ of phase (steps S31 and S32), the control device sets initial values $A_0$ and $P_0$ of amplitude and phase respectively (steps S33 and S34). Subsequently, when having set the number of adjustment of amplitude $A_n$ and the number of adjustment of phase $P_n$ (steps S35 and S36), the control device sets an adjustment-phase counter to "0" (step S37) and an initial setting completion flag to "ON" (step S38), ending the initial setting process.

Figure 6:
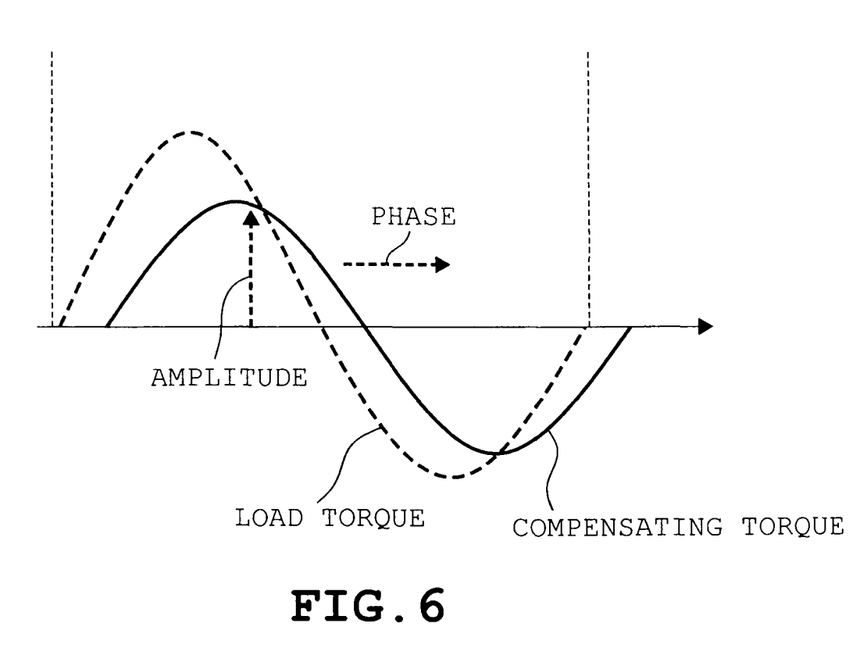
FIG. 6 is a graph showing typical examples of load torque fluctuation and a torque compensation current command.

Returning to FIGS. 4A and 4B, the motor control device 20 determines at step S16 whether or not the count of the adjustment-phase counter is equal to or smaller than the number of adjustment of the amplitude $A_n$. When the count is equal to or smaller than the number of adjustment (YES), the adjustment becomes a phase of adjusting the amplitude (step S17). When incrementing the adjustment-phase counter (step S18), the motor control device 20 executes an amplitude adjusting process (step S19). The motor control device 20 then advances to step S25 to calculate a torque-compensating current command $I_{q\_ref2}$ to cancel torque fluctuation (step S25; and see FIG. 6). The load torque fluctuation as shown in FIG. 6 is obtained by modeling an actual waveform as shown in FIG. 12 into a simple sinusoidal wave (namely, a fundamental frequency component only).

In the subsequent speed fluctuation suppressing control, the motor control device 20 continues the adjustment of amplitude $A_n$ at step S19 when determining in the affirmative (YES) at step S16. On the other hand, when determining in the negative (NO) at step S16, the motor control device 20 determines whether or not the count of the adjustment-phase counter is equal to or smaller than a sum of the number of the amplitude adjustments and the number of phase adjustments (step S20). When determining in the affirmative (YES) at step S20, the motor control device 20 switches the adjustment-phase counter to a phase of adjusting the phase (step S21). The motor control device 20 increments the adjustment stage counter (step S22) and executes a phase adjusting process (step S23), thereafter proceeding to step S25. On the other hand, when determining in the negative (NO) at step S20, the motor control device 20 clears the adjustment-phase counter (step S24), thereafter proceeding to step S25.

At step S25, the torque compensating current calculating section 10 calculates a torque compensating current command $I_{q\_ref2}$ to cancel the torque fluctuation based on the following equation (15):

$$I_{q\_ref2}=A_1\cdot\sin(\theta_1+P_1)+A_2\cdot\sin(\theta_2+P_2)+A_3\cdot\sin(\theta_3+P_3) \quad (15)$$

where symbol $A_n$ (where n=1, 2, 3, ...) and symbol $P_n$ designate outputs of the amplitude/phase adjusting section 9 respectively, and symbol $\theta_n$ designates a phase angle of the load torque fluctuation calculated by the load torque frequency/angle extracting section 13 on the basis of equation (14).

Figure 11B:
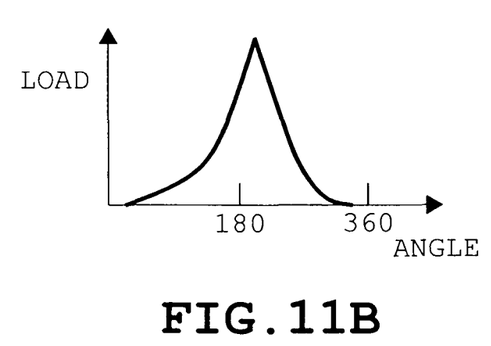

Initial values of amplitude $A_n$ and phase $P_n$ set at respective steps S31 and S32 are arbitrary and may be zeroes, for example. Furthermore, the order n may depend upon to what extent the torque control should be executed. When the order n becomes higher, load of calculation is rendered larger although the accuracy in the torque control is increased. For example, when the actual torque fluctuation takes the waveform as shown in FIG. 11B, it is desirable that the calculation should cover frequencies with higher order so that the same compensating torque current waveform is obtained as much as possible. However, conformation of a fundamental frequency component has a greatest importance in the compensation. This will be described in the following with the order n of 1.

The torque compensating current command $I_{q\_ref2}$ is obtained from the initially set amplitude $A_1$ and phase $P_1$, in an initial control period. In the next control period, the amplitude $A_1(x)$ and phase $P_1(x)$ are determined by the following equations (16) and (17) respectively (steps S19 and S23):

$$A_1(x)=A_1(x-1)+(\text{amplitude adjustment sign})\times A\alpha \quad (16)$$

$$P_1(x9)=P_1(x-1)+(\text{phase adjustment sign})\times P\alpha \quad (17)$$

More specifically, the amplitude $A_1(x)$ and the phase $P_1(x)$ of the current control period are determined to take values increased or decreased from $A_1(x-1)$ and $P_1(x-1)$ in the last control period by adjustment values $A_\alpha$ and $P_\alpha$ respectively. The amplitude $A_1$ and the phase $P_1$ in equation (15) are adjusted by equations (16) and (17) respectively so that such output torque as to cancel the load torque fluctuation is generated. As a result, an approximately sinusoidal compensating current command $I_{q\_ref2}$ can be applied to the motor.

Figure 5B:
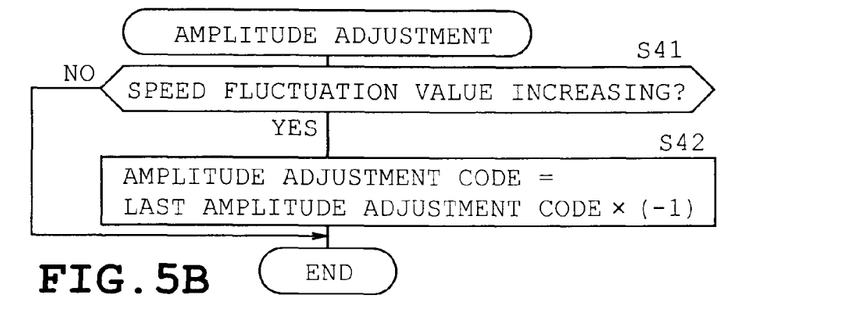

The amplitude adjustment executed at step S19 will be described with reference to FIG. 5B. The speed fluctuation undergoes a transition in the decreasing direction when the torque compensating current $I_{q\_ref2}$ obtained by equation (16) works in such a direction that the load torque fluctuation is canceled. More specifically, since the amplitude adjustment carried out over the last and current control periods works in a desirable direction in this case, the adjustment sign need not be changed in the adjustment by equation (16) (step S41: NO). For example, this control manner may be applied to a case where the amplitude adjustment works so as to increase the amplitude under the condition where the amplitude of the compensating torque is insufficient relative to the load torque fluctuation. The control is desirably maintained in the sequence of increase in the last amplitude but one, increase in the last amplitude and current amplitude.

On the other hand, when the torque compensating current $I_{q\_ref2}$ does not work so as to cancel the load torque fluctuation, the speed fluctuation transitions so that the speed fluctuation is increased. More specifically, the adjustment executed over the last and current control periods has worked in an undesirable manner. Accordingly, the amplitude adjustment sign of equation (16) needs to be changed (step S41: YES). This condition occurs, for example, in the case where the amplitude of the compensating torque is excessively large relative to the load torque fluctuation. In this case, the control needs to be carried out in the sequence of increase in the last amplitude but one, increase in the last amplitude and current amplitude. Accordingly, the amplitude adjustment sign of equation (16) is reversed (step S42).

Figure 5C:
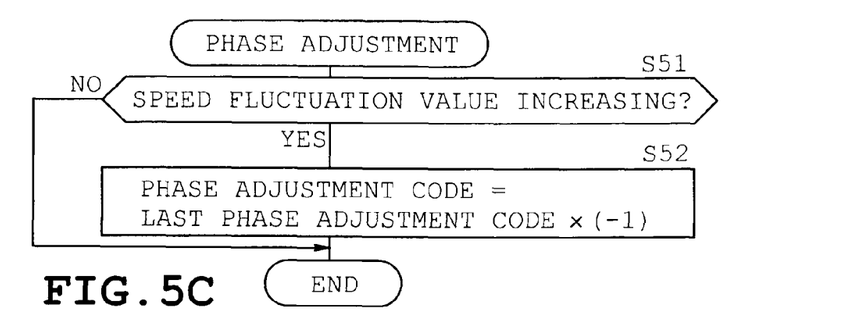

The phase adjustment of equation (17) will be executed in the same manner as described above regarding the amplitude adjustment. The torque compensating current command $I_{q\_ref2}$ obtained by equation (15) is sinusoidal, and the compensating torque phase is shifted relative to the load torque phase when the phase is increased or decreased, whereupon the speed fluctuation is increased or decreased. FIG. 5C shows the processing for the phase adjustment (steps S51 and S52).

The adjustments of amplitude $A_n$ and phase $P_n$ are carried out every control period while the speed fluctuation is being detected. Accordingly, when both of amplitude $A_n$ and phase $P_n$ are simultaneously adjusted in a control period, it cannot be determined which of the two has brought about the result. As a result, either one of the two is adjusted every control period. For example, when the compensating torque current command $I_{q\_ref2}$ has the order of 1, two adjustment algorithms are executed alternately since two items $(A_1, P_1)$ needs to be adjusted. Consequently, the adjustment result converges toward the combination of amplitude and phase each of which minimizes the speed fluctuation, as shown in FIGS. 8A, 8B, 8C and 9.

Figures 8A, 8B:
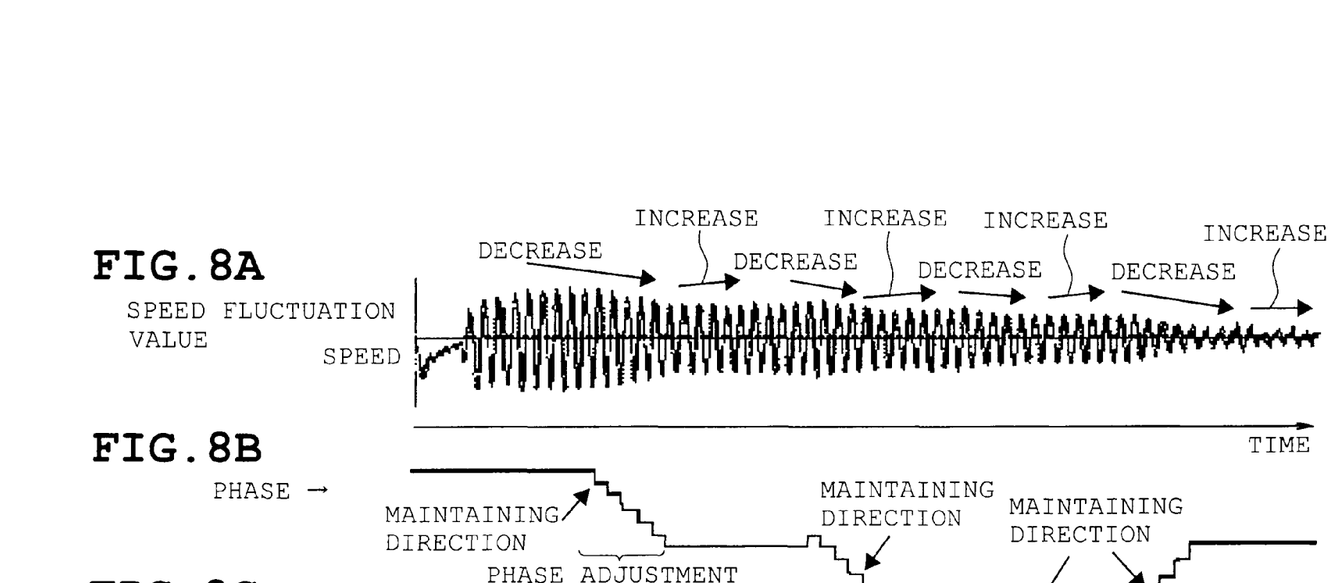
FIGS. 8A, 8B and 8C show an adjusting process suppressing speed fluctuation.
Figure 8C:
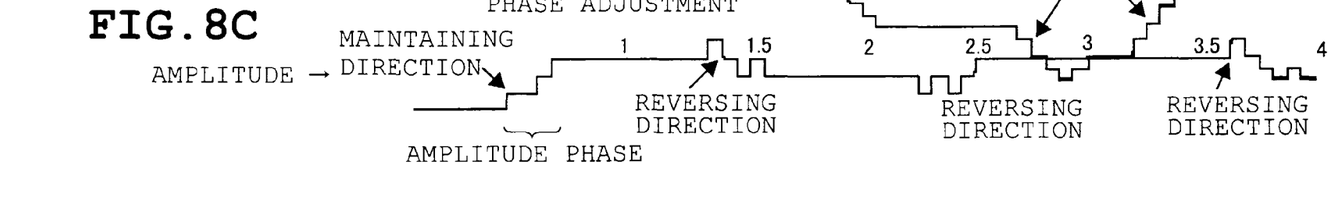

FIGS. 8A to 8C show the case where when the amplitude adjustment is firstly executed in the adjustment-phase of amplitude so as to increase the amplitude $A_1$ (FIG. 8C), the adjustment works so that the speed fluctuation is decreased (FIG. 8A). Subsequently, when the adjustment of phase is executed so as to decrease the phase $P_1$ (FIG. 8B), the phase adjustment works so that the speed fluctuation is decreased (FIG. 8A). Subsequently, when the adjustment of amplitude is executed so as to increase the amplitude $A_1$ by one step (FIG. 8C), the amplitude adjustment works so that the speed fluctuation is increased (FIG. 8A). Accordingly, the amplitude $A_1$ is adjusted so as to be decreased, and subsequently, the adjustment control is rendered stable. As a result, the amplitude $A_1$ is finally decreased by one step, and the motor control device 20 proceeds to the phase control (FIG. 8B) in this state. Since the response to the control has a slight time lag, there is a slight shift between the timings of the increase and decrease of the speed fluctuation and the timings of directions of adjustment.

Figure 9:
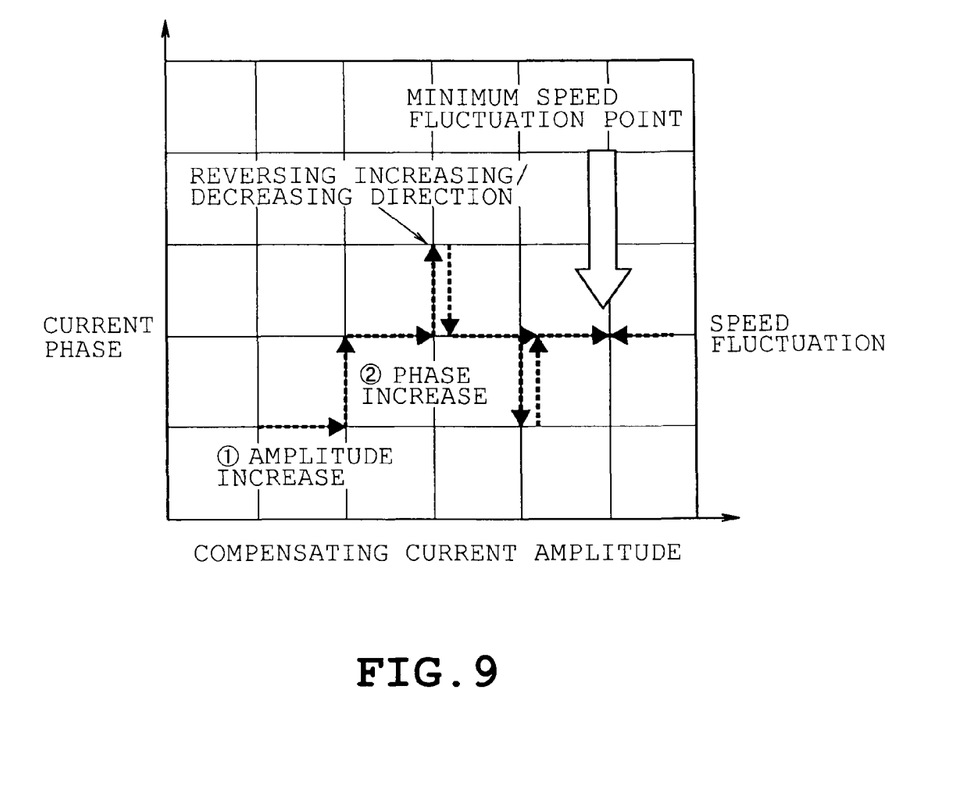
FIG. 9 is a view similar to FIG. 8, showing another adjusting process.

FIG. 9 shows the process of converging the speed fluctuation on the minimum point by alternate adjustment of the amplitude $A_1$ and phase $P_1$. The abscissa axis denotes the amplitude $A_1$ and the ordinate axis denotes the phase $P_1$ in FIG. 9. The amplitude A1 and the phase P1 at the speed fluctuation minimum point in FIG. 9 denote the values after completion of adjustment, which values correspond to the adjustment values obtained at right ends of FIGS. 8B and 8C respectively.

Figure 10A:
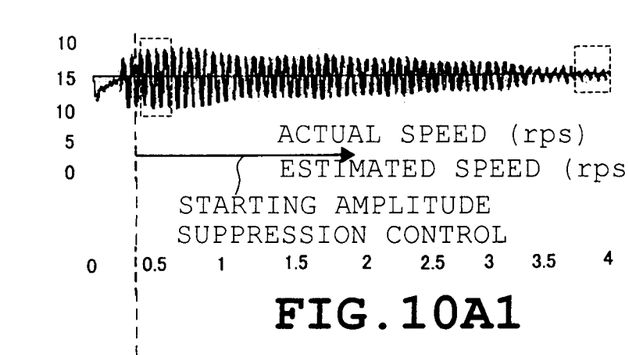
Figure 10A:
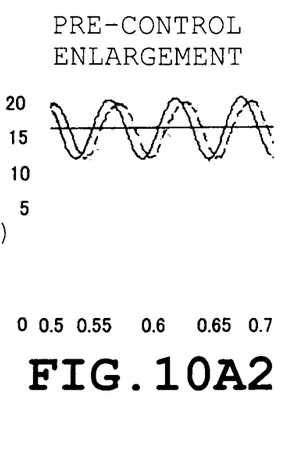
Figure 10A:
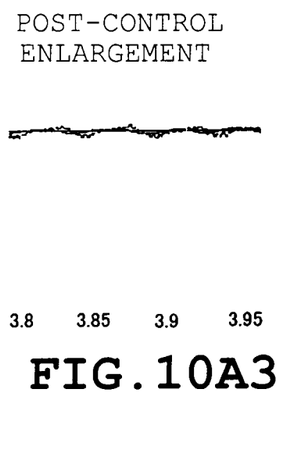
Figure 10B:
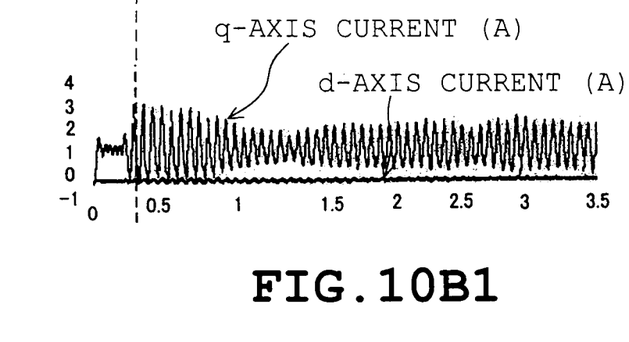
Figure 10B:
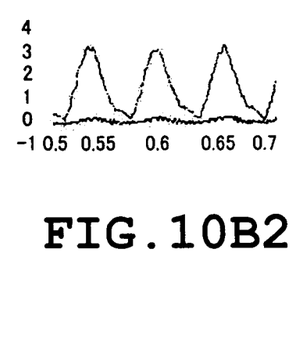
Figure 10B:
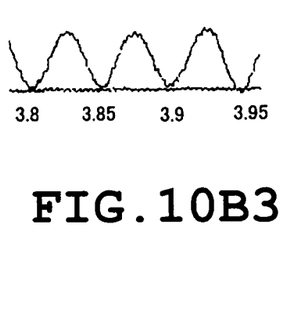
Figure 10C:
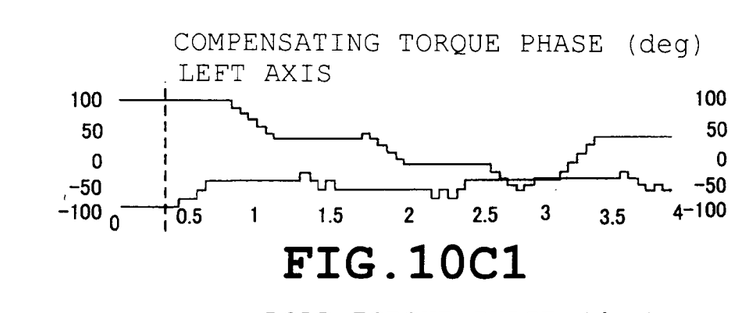
Figure 10C:
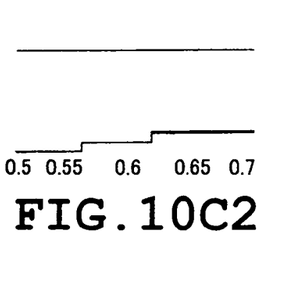
Figure 10C:
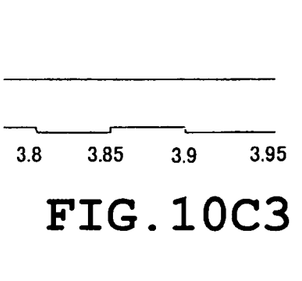
Figure 10D:
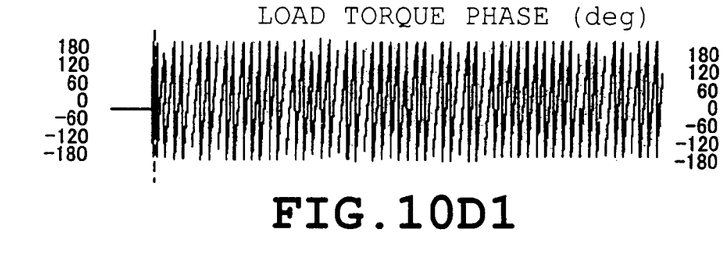
Figure 10D:
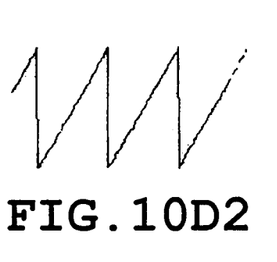
Figure 10D:
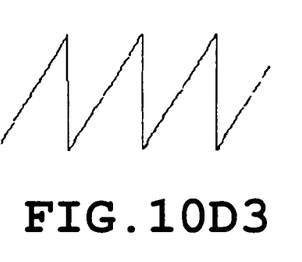
Figure 10E:
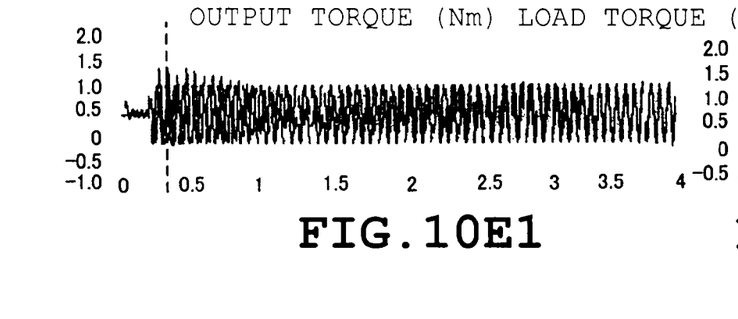
Figure 10E:
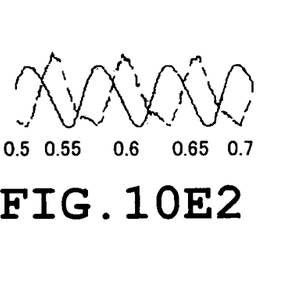
Figure 10E:
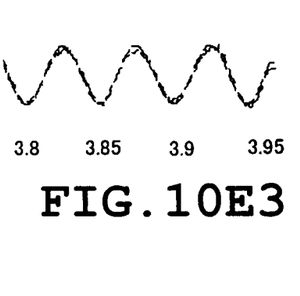

FIGS. 10A1 to 10E3 show measured signal waveforms denoting the state where the speed fluctuation is actually suppressed, respectively. FIGS. 10A1 to 10A3 show the motor speed ω. The estimated speed ω lags behind an actual speed before start of the speed suppressing control, whereupon the speed fluctuation is large. FIG. 10A2 shows an enlarged speed fluctuation before execution of the control as shown in FIG. 10A1 (a left part encompassed by broken line). FIG. 10A3 shows an enlarged speed fluctuation after execution of the control as shown in FIG. 10A1 (a right part encompassed by broken line). In the same manner, the motor output torque or q-axis current $I_q$ (see FIGS. 10B1 to 10B3) lags behind the load torque $T_q$ as shown in FIGS. 10E1 to 10E3. The angle of estimated load torque is shown as the load torque phase $θ_1$ (see FIGS. 10D1 to 10D3). FIGS. 10C1 to 10C3 show the compensating torque current amplitude $A_1$ and the compensating torque current phase $P_1$ (the same as FIGS. 8A-8C respectively). The relationship between FIGS. B2, B3, C2, C3, D2, D3, E2 and E3 and B1, C1, D1 and E1 is the same as between FIGS. A1 and A2 and FIG. A3 as described above, respectively.

In the above-described case, a ratio between the number of amplitude adjustment and the number of phase adjustment is set at 5:6, whereupon the amplitude and phase adjustments are executed alternately so that the number of times of phase adjustment becomes larger than the number of times of amplitude adjustment. More specifically, it is more important to adjust the phase $P_1$ rather than the amplitude $A_1$ for the purpose of suppressing the speed fluctuation thereby to match the phase $P_1$ with the frequency of load torque fluctuation. Thus, the speed fluctuation is reduced as the result of alternate execution of the amplitude and phase adjustments, and the load torque $T_q$ finally corresponds substantially with the motor output torque $I_q$.

According to the above-described embodiment, the motor control device 20 includes the position estimating section 5 which estimates the rotational speed ω the electrical angle $θ_M$ based on the phase currents $I_u$, $I_v$ and $I_w$ detected by the current detecting section 3. The load torque estimating section 11 then estimates the load torque $T_q$ from the torque current $I_q$ obtained on the basis of the phase currents $I_u$, $I_v$ and $I_w$ and the electrical angle $θ_m$, the constant of the motor 2 and the inertia moment of the motor 2 inclusive of the compressing section 23 of the compressor 22. The load torque $T_q$ is to be produced by the compressor 22.

The load torque frequency/angle extracting section 12 calculates the phase of periodical fluctuation indicated by the load torque $T_q$ (load torque phase $θ_n$). The torque-compensating current calculating section 10 determines the sinusoidal torque-compensating current that changes based on the load torque phase $θ_n$. The amplitude/phase adjusting section 9 detects the speed fluctuation of the motor 2, adjusting the amplitude $A_n$ and phase $P_n$ of the torque-compensating current by increasing or decreasing these amplitude $A_n$ and phase $P_n$.

Accordingly, the compensation of output torque is executed in a dynamic manner in the arrangement of driving the motor 2 by the sensorless system or without use of a position sensor, whereupon the motor 2 can be controlled so that the motor speed ω follows the target speed $ω\_ref$. This control manner is carried out without obtaining accurate torque fluctuation characteristic data of the compressor 22 to be driven by the motor 2. Consequently, the motor control device 20 can considerably reduce development costs for application thereof to the air conditioner and can control the air conditioner with higher control accuracy.

The amplitude/phase adjusting section 9 calculates the differential value of the speed fluctuation of the motor 2. The amplitude/phase adjusting section 9 maintains the increase or decrease for adjustment of the amplitude or phase when the differential value is negative. The amplitude/phase adjusting section 9 reverses the increase or decrease for the adjustment.

Thus, as the result of compensation of the torque current command $I_{q\_ref2}$, the increase or decrease of the adjustment is determined depending upon whether or not the speed fluctuation has been decreased or increased, whereupon the fluctuation can rapidly be suppressed. Furthermore, since the amplitude/phase adjusting section 9 adjusts either the amplitude $A_n$ or phase $P_n$ consecutively at a plurality of times and thereafter switches to the other. As a result, the adjustment can be promoted while the influences of the amplitude $A_n$ and the phase $P_n$ upon the adjustment is being confirmed.

Furthermore, the amplitude/phase adjusting section 9 sets the numbers of times of consecutive adjustment of the respective phase $P_n$ and the amplitude $A_n$ so that the number of times of phase $P_n$ adjustment is larger than the number of times of amplitude $A_n$ adjustment. Consequently, the speed fluctuation can be suppressed further rapidly since the adjustment of phase $P_n$ that is considered to exert a larger influence on the adjustment is executed at a larger number of times. Additionally, the torque-compensating current calculating section 10 also determines the torque compensating current corresponding to the frequency with higher order in the fluctuation of load torque as well as the torque compensating current command $I_{q\_ref2}$. Consequently, the amplitude $A_n$ and the phase $P_n$ can be adjusted under the condition where the torque-compensating current waveform is approximated more closely to the load torque fluctuation waveform as compared with conventional arrangements.

The foregoing embodiment should not be restrictive but may be modified into various forms. Thus, a part of the embodiment may be eliminated, substituted or modified. For example, the ratio between the number of times of amplitude adjustment and the number of times of phase adjustment should not be limited to 5:6 but may be set suitably. The ratio may be set to 1:1 so that each of the amplitude adjustment and the phase adjustment is executed at eight times.

Furthermore, the motor control device 20 may be applied to electrical equipment provided with a compressor, such as refrigerators, dryers, washers-dryers and the like. Additionally, the load driven by the motor should not be limited to the compressor. The motor control device may be applied to electrical equipment in which load periodically fluctuates.

While certain embodiments have been described, these embodiments have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A motor control device comprising:
an electric power supply unit which supplies AC current to an electric motor driving a load;
a current detecting unit which detects current flowing into a winding of the motor;
a speed/electrical angle estimating unit which estimates a rotational speed and an electrical angle of the motor, based on the current detected by the current detecting unit;
a load torque estimating unit which estimates a load torque to be produced by the load, from a torque current obtained based on the current detected by the current detecting unit and the electrical angle estimated by the speed/electrical angle estimating unit, a motor constant and inertia moment of the motor inclusive of the load;
a load torque phase calculating unit which calculates a phase of periodic fluctuation indicated by the load torque;
a torque-compensating current determining unit which determines a sinusoidal torque compensating current, based on the load torque phase; and
an amplitude/phase adjusting unit which detects a speed fluctuation of the motor to adjust an amplitude and a phase of the torque-compensating current by increasing or decreasing the amplitude and the phase so that the speed fluctuation is reduced.

2. The device according to claim 1, wherein when having calculated a differential value of the motor speed fluctuation, the amplitude/phase adjusting unit maintains a last increasing/decreasing direction of the adjustment by the amplitude/phase adjusting unit in a case where the differential value is negative, and the amplitude/phase adjusting unit reverses the last increasing/decreasing direction in a case where the differential value is positive.

3. The device according to claim 1, wherein the amplitude/phase adjusting unit adjusts either one of the amplitude and the phase continuously at a plurality of times and thereafter, is switched to adjust the other.

4. The device according to claim 1, wherein the amplitude/phase adjusting unit sets a number of times of the continuous phase adjustment larger than a number of times of the continuous amplitude adjustment.

5. The device according to claim 1, wherein the torque-compensating current determining unit also determines a torque-compensating current corresponding to a higher order frequency component in the load torque fluctuation.

6. Electrical equipment comprising:
a compressor;
an electric motor driving the compressor;
an electric power supply unit which supplies AC current to the motor;
an electric power supply unit which supplies AC current to an electric motor driving a load;
a current detecting unit which detects current flowing into a winding of the motor;
a speed/electrical angle estimating unit which estimates a rotational speed and an electrical angle of the motor, based on the current detected by the current detecting unit;
a load torque estimating unit which estimates a load torque to be produced by the load, from a torque current obtained based on the current detected by the current detecting unit and the electrical angle estimated by the speed/electrical angle estimating unit, a motor constant and inertia moment of the motor inclusive of the load;
a load torque phase calculating unit which calculates a phase of periodic fluctuation indicated by the load torque;
a torque-compensating current determining unit which determines a sinusoidal torque-compensating current, based on the load torque phase; and
an amplitude/phase adjusting unit which detects a speed fluctuation of the motor to adjust an amplitude and a phase of the torque-compensating current by increasing or decreasing the amplitude and the phase so that the speed fluctuation is reduced.

* * * * *